United States Patent Office 3,529,365
Patented Sept. 22, 1970

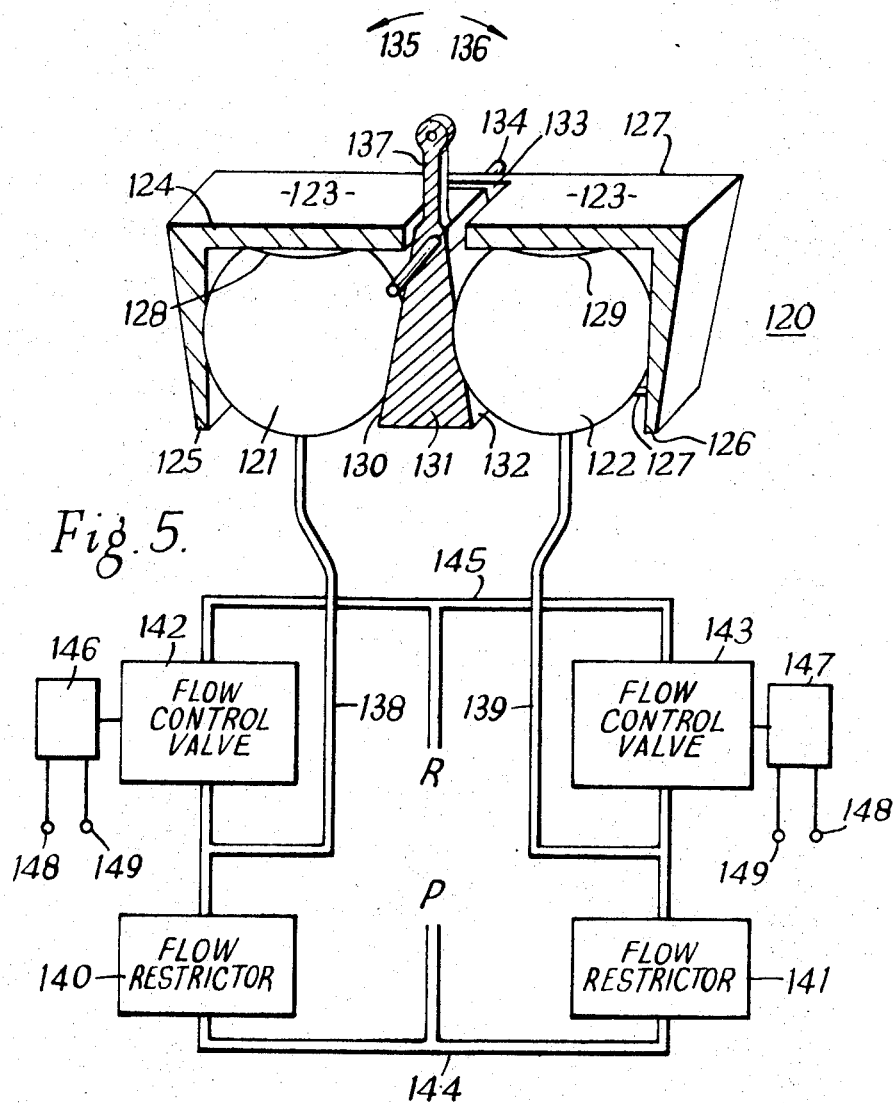

3,529,365
GROUND BASED FLIGHT TRAINING OR SIMULATING APPARATUS
Meville Leslie Shelley, Haywards Heath, England, assignor to Communications Patents Limited
Filed Feb. 13, 1967, Ser. No. 615,777
Claims priority, application Great Britain, Mar. 14, 1966, 11,099/66
Int. Cl. G09b 9/08
U.S. Cl. 35—12                                    10 Claims

ABSTRACT OF THE DISCLOSURE

In ground-based flight simulating apparatus, this invention provides means for reproducing the "feel" of the simulated aircraft flight control column by generating a force acting thereon corresponding to the simulated flight conditions. If such force is generated by a single hydraulic jack, which must provide the force in any position of the control column, a large and sluggish force generator results.

The present invention provides a follow-up jack which merely positions a small-displacement motor correspondingly to the control column position. The force signal from the flight computer then controls the small motor which applies the simulated force to the control column with quick response.

This invention relates to ground-based flight training or simulating apparatus providing flying controls, in which the forces experienced by the pilot operating the flying controls vary according to the different conditions of the simulated flight.

In flight training or flight simulating apparatus, controls and instruments are provided which are representations of the controls and instruments of an aircraft, and a relationship is established between the controls and the instruments of the training or simulating apparatus, usually by a computing device, so that the operation of the controls of the apparatus will cause the instruments thereof to indicate appropriate flight conditions. It is customary in the design of an aircraft to provide for a system of natural or artificial forces to oppose the pilot in his attempt to displace the flying controls. The nature and magnitude of the effects produced by the controls is arranged so as to provide sensitivity of control for limited manoeuvres whilst at the same time restricting, in the interests of safety, the total effect which may be obtained. The present invention relates particularly to apparatus for loading the controls of the flight training or simulating apparatus so as to reproduce the forces operating on the controls under equivalent conditions in the aircraft.

It has been recognized for some time that the fidelity of feel of the controls in a flight training or simulating apparatus has a significant effect, not only on the ability of pilots to carry out precise manoeuvres but in their psychological attitude to the training apparatus and therefore the value of the training obtained thereby. The forces on the controls of an aircraft should be reproduced faithfully, not only for fixed control positions but also as they vary during movement of the controls. During the movement of the controls of an aircraft, additional forces act on the controls, which forces are related, for example, to the dynamic characteristics of the control member movement, the control surfaces, the control surface actuator system, and the artificial control force generator. Hitherto, these requirements have been substantially met, using control loading apparatus incorporating feedback in a closed loop arrangement to linearise performance, the feedback being provided by monitoring the force output of the system.

In order to simulate with sufficient realism, the effects produced on the operation of controls of modern high speed aircraft, it is necessary that the transient responses of the control loading system should be very good. This requires that the frequency response of the system should extend smoothly from the steady state to at least 10 c.p.s.

One form of control loading system capable of providing such high fidelity of response is described in the U.S. Pat. No. 3,220,121, of common ownership herewith. In this system, forces are applied to a control by a main force generator and an auxilliary force generator through a mechanical summing device.

It is an object of the present invention to provide a simulated control loading system in which force for loading a control of the system, and displacements corresponding to control movements are provided by separate means, the displacements being imparted to the force producing means so that a relatively small proportion of the work load of the system has to be borne by the force producing means and highly fidelity of response is thereby achieved.

Accordingly, the present invention provides a flight training, or like simulating apparatus, for simulating a specific aircraft type, including a control member which is displaceable manually, computing means for computing an electrical quantity representing in magnitude a force required to load the control member according to the displaced position thereof, force generating means having a moving member adapted to apply force to the control member, said force generating means being responsive to the said electrical quantity, means responsive to the control member displacement for displacing the said force generating means to a position corresponding to the displaced position of the control member, whereby the range of displacement of the moving member of said force generating means for applying said force to the control member, is small relatively to the range of displacement of the force generating means and high fidelity of response is achieved.

In order that the invention may be readily carried into practical effect, three embodiments thereof will now be described, by way of example, with reference to the accompanying drawings, in which:

FIG. 5 is a diagram, partly schematic and partly perspective, showing a force generator using fluid filled bladders.

Figure 1:
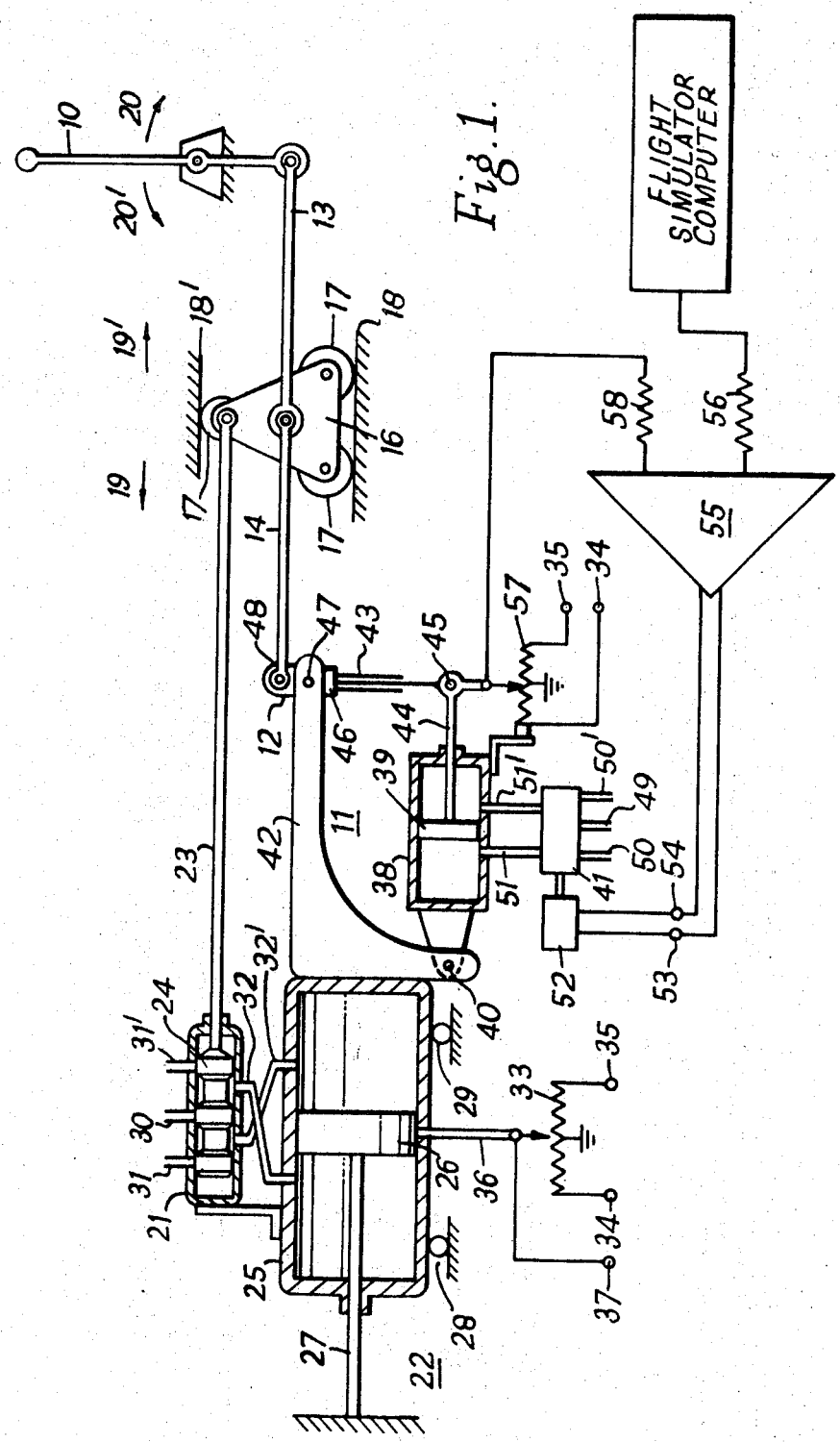
FIG. 1 is a block diagram of a control loading system for a flight training or simulating apparatus in which a force producing device is used in conjunction with a follow-up mechanism, so that the work load on the force producing device is reduced.

Referring to FIG. 1, a control column 10, representing a control member of the aircraft being simulated, is mechanically coupled to a force generator, indicated generally in the drawing by the reference number 11, by which forces are applied to the control column during the simulation of the aircraft performance. The force generator 11, will be described in detail later in the specification.

The control column 10 is coupled to an output member 12 of the force generator 11 by links 13 and 14 which also engage a pivot 15 attached to the body of a crosshead 16. The crosshead 16 is supported by three rollers 17, so as to move freely between guides 18 and 18′, in directions indicated by arrows 19 and 19′ corresponding to displacements imparted to the control column by the pilot, in directions indicated by the arrows 20 and 20′ respectively.

The crosshead 16 is mechanically coupled to operate a control valve 21 of a hydraulic follow-up mechanism, indicated generally in the drawing by the reference 22. The mechanical coupling is provided by a connecting rod 23, which is attached to the body of the crosshead 16 and to a movable setting member 24 of the control valve 21.

The follow-up mechanism 22 is provided by a hydraulic jack, having a cylinder 25 and a ram 26, to which oil is supplied by way of the valve 21. The ram 26 is anchored to chassis by way of a rod 27, which passes through a seal in an end wall of the cylinder 25. The cylinder 25 is mounted on rollers 28 and 29, in a manner such that the cylinder is free to move to and fro axially in directions parallel to those of the crosshead 16, as indicated by the arrows 19 and 19′.

The valve 21 is connected to a hydraulic system, which is not shown, by way of pipes 30, 31 and 31′ and to the cylinder 25 of the jack by way of pipes 32 and 32′. Oil under pressure is supplied to the valve by pipe 30 and is returned to the system by pipes 31 and 31′. When the moveable member 24 of the valve is displaced, as a result of displacement of the control column in the direction of the arrow 20, oil is passed to and from the jack by pipes 32 and 32′ respectively, to cause the cylinder and the body of the valve 21 to move in the direction of the arrow 19.

When the moveable setting member 24 of the valve is displaced as a result of the displacement of the control column in the direction of the arrow 20′, oil is passed to and from the jack by pipes 32′ and 32 respectively, to cause the cylinder and the body of the valve 21 to move in the direction of the arrow 19′.

After the body of the valve 21 has moved by an amount equivalent to that of the crosshead 16, the position relationship between the moveable member and the body of the valve is restored to neutral, so that the flow of oil ceases and the cylinder comes to rest. Hence, the to and fro movements of the cylinder 25 follow those of the crosshead 16. Therefore, these movements may be used to operate a pick-off device for providing a signal corresponding to control column displacement. This signal is fed to a computer where the aerodynamic performance of the simulated aircraft is reproduced and the consequent indications fed to the instruments of the pilot.

Such a computer is described in detail in a paper entitled "Flight Simulators," published in The Journal of the Royal Aeronautical Society, vol. 58, No. 519, March 1954.

In the system according to FIG. 1, the pick-off device is a potentiometer 33. The wiper of the potentiometer 33 is coupled to the cylinder 25 of the jack by a rigid member 36 and is connected to a terminal 37, from which the displacement signal for feeding to the computer is provided. The winding of the potentiometer 33 is centre tapped and is fed with alternating current of opposite phase relationship, from a source of supply, not shown in the drawing, connected to terminals 34 and 35.

The force generator 11 is provided with a second hydraulic jack, having a cylinder 38 and a ram 39, to which oil is supplied by way of a valve 41. The cylinder 38 has a lug attached to one end wall which engages a pivot 40, near the extremity of one limb of an L-shaped bracket 42. The ram 39 is coupled to a pivot 45 near the free end of a multi-leaf cantilever spring 43, by way of a rod 44, which passes through a seal in the other end wall of the cylinder 38, and which serves as a moving member adapted to apply force to the control member 10.

The spring 43 is attached to a rigid shank 46, to form the output member 12. The shank 46 is adapted to rotate about a pivot 47, so that the output member 12 acts as a lever. The link 14 and the rod 44 are attached near to opposite ends of this lever, the point of attachment of the link 14 being nearer to the pivot 47 than the point of attachment of the rod 44, so as to provide amplification of the force generated by the jack. The pivot 47 is located near to the extremity of the other limb of the bracket 42.

The force generator 11 is mounted on the cylinder 25 of the follow-up mechanism 22, in a manner such that the forces provided by the output member 12 are applied to the link 14, via the pivot 47, in the directions indicated by the arrows 19 and 19′. For this purpose, the limb of the bracket 42 carrying the pivot 40 is attached to the end wall of the cylinder 25 opposite to the end wall carrying the seal.

The valve 41 is connected to a hydraulic system, which is not shown, by way of pipes 49, 50 and 50′ and to the cylinder 38 by way of pipes 51 and 51′. Oil under pressure is supplied to the pipe 49 and is returned to the system by pipes 50 and 50′. The valve 41 is actuated by an electro-dynamic control unit 52, terminals 53 and 54 of which are connected to the output of an amplifier 55.

When the movable member of the valve 41 is displaced as a result of the application of a voltage of positive polarity to the terminal 53, oil is passed to and from the cylinder 38 by pipes 51 and 51′ respectively. This causes the spring 43 to be deflected so that force is applied to the link 14 in the direction of the arrow 19. When the moveable member of the valve 41 is displaced, as a result of the application of a voltage of positive polarity to the terminal 54, oil is passed to and from the cylinder 38 by pipes 51′ and 51 respectively. This causes the spring 43 to be deflected so that force is applied to the link 14 in the direction of the arrow 19′.

The demanded force is determined in the computer, from the control column displacement, airspeed and various other factors, some of which have been mentioned above, and an electrical signal representing the demand force is fed by way of a summing resistor 56 to the input of the amplifier 55.

The demanded force signal is answered by a position feedback signal derived from the wiper of a centre-tapped potentiometer 57. The wiper of the potentiometer is attached to a rigid extension of the rod 44 and is connected to the input of the amplifier by way of a summing resistor 58. The winding of the potentiometer is fed with alternating current of opposite phase relationship obtained from the source of supply connected to the terminals 34 and 35.

The amplifier 55 is of conventional design and the A.C. signals present at its input terminals are fed, after voltage amplification, to a phase sensitive rectifier. The rectified signals are then fed, after further amplification, to terminals 53 and 54 of the control unit 52. The polarity of the D.C. signals fed to terminals 53 and 54 is determined by the phase relationship of the A.C. signals fed to the input resistor 56, and the direction of displacement of the moveable member of the valve 41 is determined in this way. The values of the resistors 56 and 58 are chosen so that the combined input to the amplifier is zero and the valve 41 is allowed to close when the spring 43 is deflected by an amount such that the force supplied to the control column is equal to the demanded force determined in the computer.

As already mentioned earlier in the specification to and fro movements of the crosshead 16, produced by the displacements of the control column, are followed by corresponding movements of the cylinder 25. Therefore, the shank 46 of the output member 12 is maintained substantially in a neutral position, that is to say, with the centre line of the shank substantially at right angles to the centre line of the link 14.

The design of the spring 43 is such that forces of the desired magnitude are provided by relatively small to and fro movements of the pivot 45. The force generator 11 is required only to provide a relatively small proportion of the work load of the system; hence, the desired high fidelity of response can be achieved.

Figure 2:
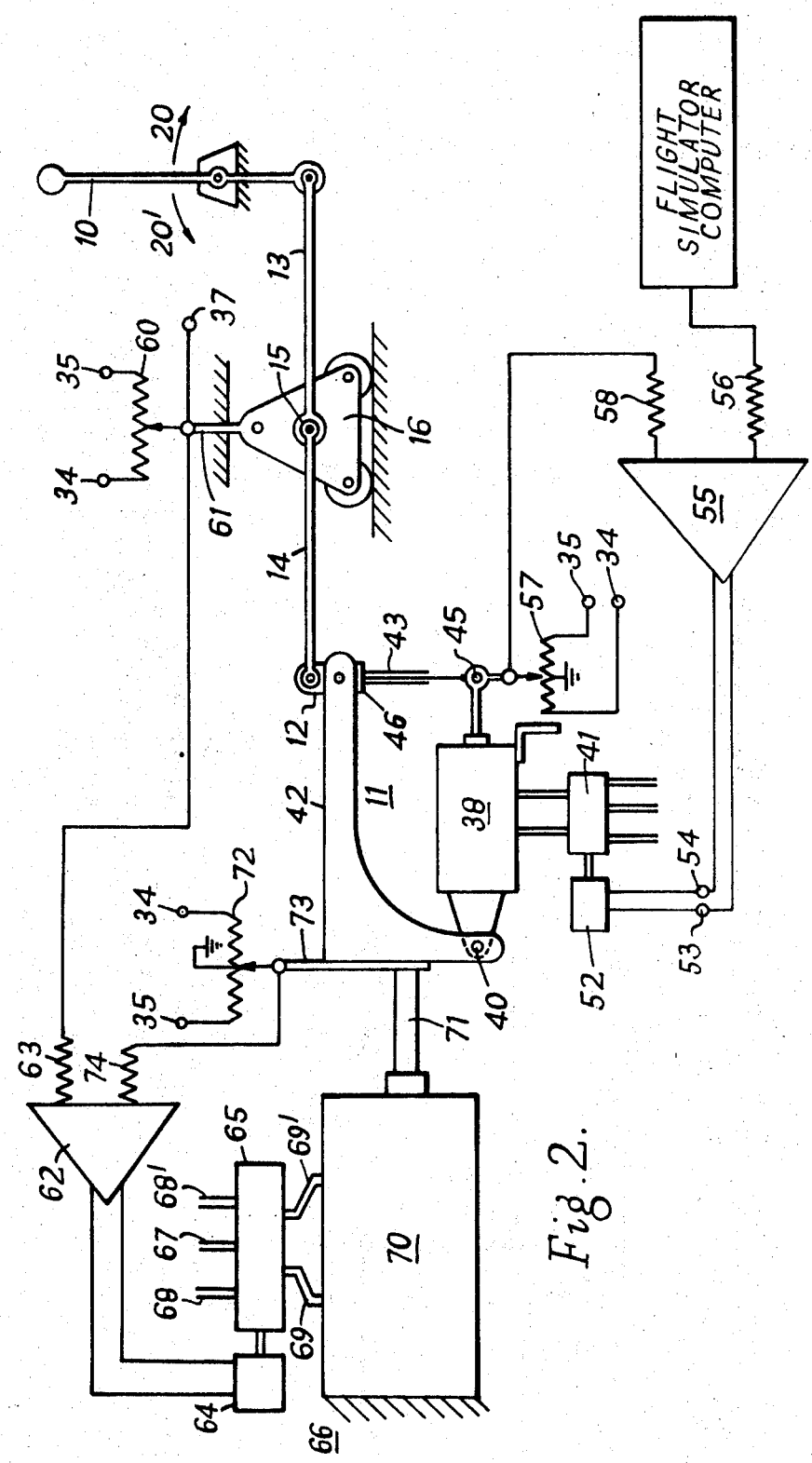
FIG. 2 is a block diagram of an alternative form of the control loading system, in which the control valve of the follow-up mechanism is electrically operated.

In the control loading system shown in FIG. 2, the control column, the crosshead and the force generator and its parts are similar to those of the system of FIG. 1 and are indicated by the same reference numbers.

The control column 10 is mechanically coupled to the output member 12 of the force generator 11, by the links 13 and 14, so that forces are applied to the control column during the simulation of the aircraft performance. The links engage the pivot 15 attached to the crosshead 16, to which the wiper of a potentiometer 60 is mechanically coupled by a rigid member 61. The winding of the potentiometer 60 is centre-tapped and its ends are fed with alternating current of opposite phase relationship from the source of supply connected to terminals 34 and 35. The wiper is connected to terminal 37, from which the displacement signal for feeding to the computer is provided.

The wiper of the potentiometer 60 is also connected to the input of an amplifier 62, by way of a summing resistor 63. The output signal of the amplifier 62 is fed to an electro-dynamic control unit 64, which is coupled to the moveable member of a control valve 65 of a hydraulic jack 66. The control valve 65 is similar to the control valve 21 of FIG. 1 and is connected to a hydraulic system, which is not shown, by way of pipes 67, 68 and 68' and to a cylinder 70 of the hydraulic jack 66 by way of pipes 69 and 69'.

In the embodiment shown in FIG. 2, the follow-up mechanism is provided by the hydraulic jack 66 and the valve and control unit 65 and 64 respectively.

The cylinder 70 of the jack is anchored to chassis and a rod 71, connected to the ram of the jack, is mechanically coupled to the bracket 42, so that to and fro movements similar to the movements provided by the hydraulic jack 22 of FIG. 1, are imparted to the force generator 11.

The signal fed to the amplifier 62 by way of the resistor 63 is answered by a position feedback signal derived from the wiper of a centre-tapped potentiometer 72, the winding of which is connected to the terminals 34 and 35 of the supply. The wiper of the potentiometer 72 is mechanically coupled to the rod 71 by a rigid member 73 and is connected to provide a signal to the input of the amplifier 62 by way of an input resistor 74. The amplifier 62 is of conventional design, the A.C. signals present at its input terminals being fed, after voltage amplification, to a phase-sensitive rectifier. The rectified signals are then fed, after further amplification, to the control unit 64. The polarity of the D.C. signal fed to the control unit 64 is determined by the phase relationship of the signals fed to the input of the amplifier and the direction of displacement of the moveable member of the valve 65 is determined in this way. The values of the resistors 63 and 74 are chosen so that the combined input to the amplifier 62 is zero and the valve 65 is closed when the rod 71 and the crosshead 16 are displaced by equal amounts. Therefore, to and fro movements of the crosshead 16, produced by displacement of the control column, are followed by corresponding movement of the rod 71 and by the force generator 11 attached thereto.

As already stated, the force generator 11 is similar to the force generator used in the control loading system of FIG. 1. The demanded force signal, determined in the computer from control column displacement, airspeed and other factors, and an answer signal derived from the potentiometer 57, are fed to the amplifier 55 by way of the resistors 56 and 58 respectively. The rectified and amplified signals from the amplifier are fed to the control unit 52, by which the valve 41 is actuated, so that deflections of the spring 43 of the output member 12 are produced by the hydraulic jack of the force generator 11.

As before the shank 46 of the output member 12 is maintained in a substantially neutral position as a result of the follow-up action provided by the hydraulic jack 66 so that the force generator is required to contribute only a relatively small proportion of the work load of the system.

Figure 3:
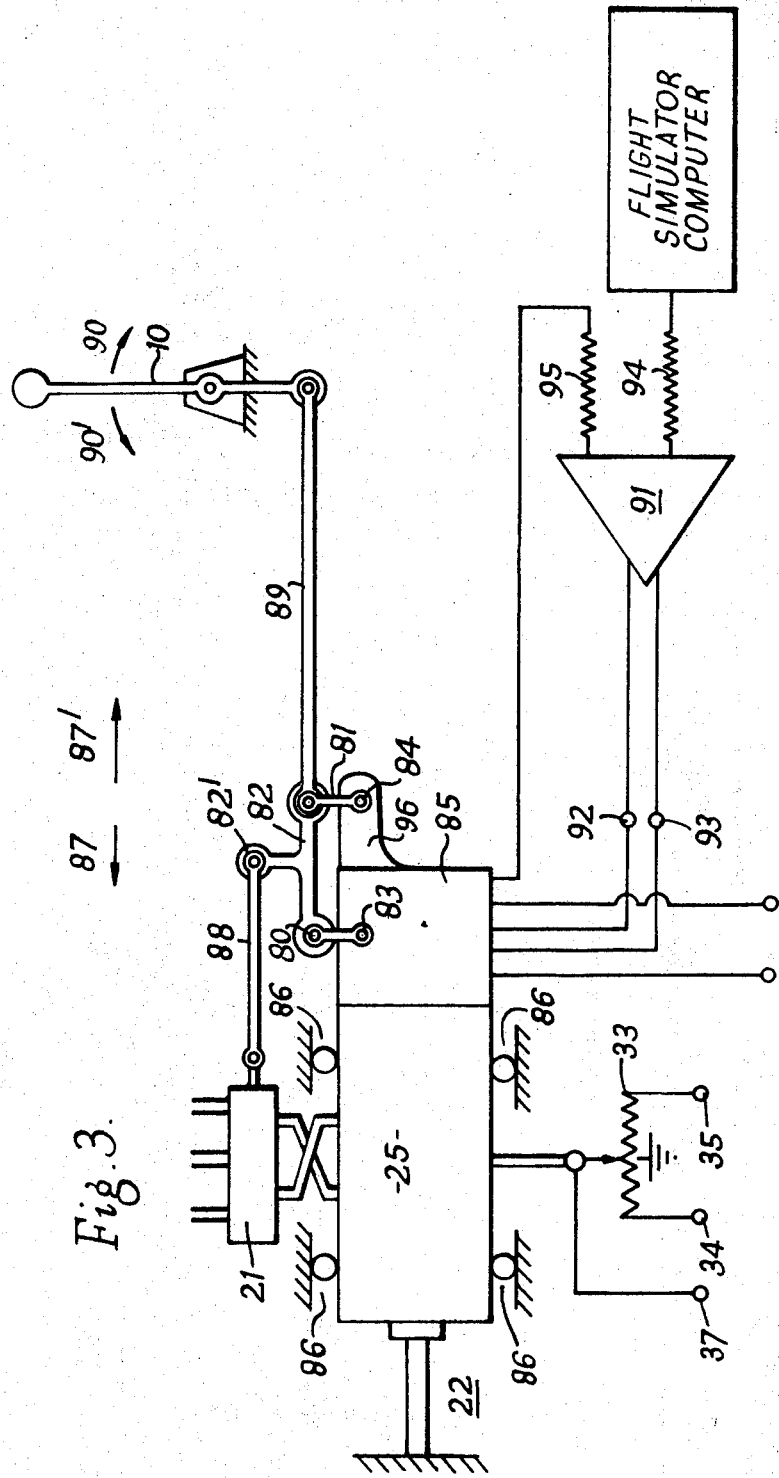
FIG. 3 is a block diagram of a control loading system in which the force producing device is an electrical torque motor.

In the control loading system shown in FIG. 3, the crosshead 16 of the arrangement of FIGS. 1 and 2, is replaced by a parallelogram linkage mechanism, comprising links 80, 81 and 82, mounted on shafts 83 and 84 respectively of a force generator 85. The shaft 83 is the shaft providing the force output of the force generator and the shaft 84 is a stub shaft mounted on an extension 96 of the body of the force generator. The linkage mechanism is carried by the force generator which is in turn attached to the follow-up mechanism of the system, hence, undesirable effects due to crosshead inertia and friction in its moving parts are avoided.

The force generator 85 is provided by an electrical torque motor, which will be described in detail later in the specification. The follow-up mechanism is generally similar to the follow-up mechanism 22 of the system of FIG. 1, and the cylinder of the hydraulic jack, the control valve and the potentiometer pick-off device are indicated by the same reference numbers as in FIG. 1.

Referring to FIG. 3, the cylinder 25 is mounted on four rollers 86 in a manner such that the cylinder is free to move to and fro axially in directions indicated in the drawing by the arrows 87 and 87'. The valve 21 is operated mechanically by a link 88, coupled to the piston of the valve and to an extension 82' of the link 82.

The link 82 of the parallelogram linkage mechanism is coupled to the control column, indicated by the reference number 10, as in FIG. 1, by way of a link 89.

As before, when the control column is displaced in directions indicated by arrows 90 and 90', corresponding displacements of the piston of the valve 21 are produced in directions indicated by the arrows 87 and 87' respectively, to cause the cylinder 25 of the hydraulic jack to follow the to and fro movements of the link 82 of the parallelogram linkage mechanism.

A signal corresponding to control column displacement is provided from terminal 37, which is connected to the wiper of the potentiometer 33, for feeding to the computer of the associated flight simulator.

Direct current signals, derived from an amplifier 91, the design of which is similar to the amplifier 55 used in the system of FIG. 1, are fed to terminals 92 and 93 of the force generator 85. The polarity of the signals fed to terminals 92 and 93 is determined by the phase relationship of the demanded force signals derived from the computer and fed to the input of the amplifier 91 by way of a summing resistor 94, and an answer signal provided by the force generator 85 is fed to the input of the amplifier by way of a summing resistor 95.

Figure 4:
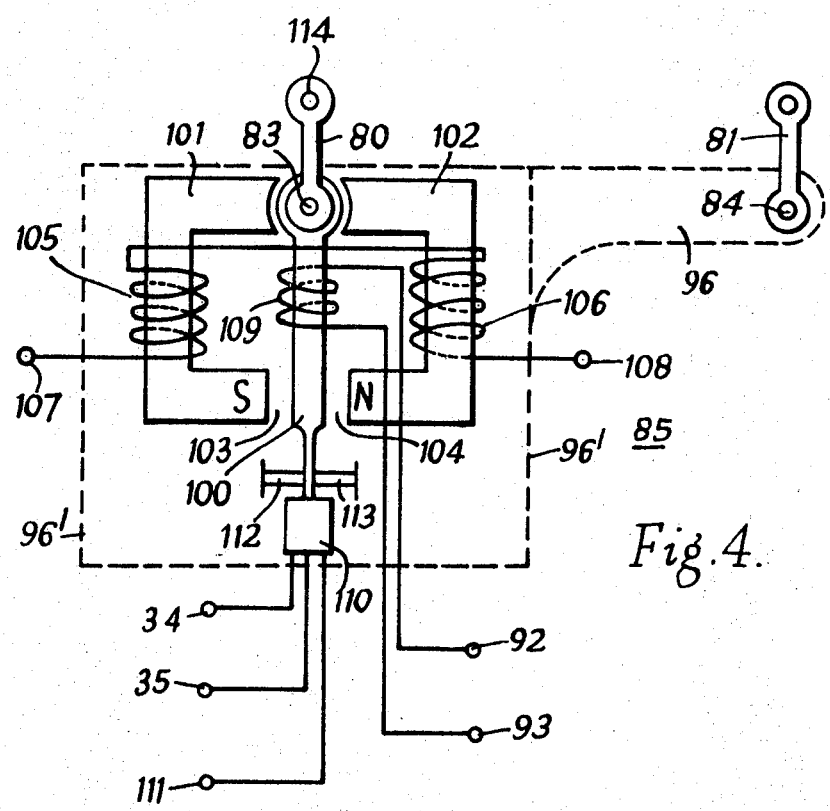
FIG. 4 is a schematic diagram of a torque motor suitable for use in the control loading system of FIG. 3.

The force generator 85 will now be described in detail with reference to FIG. 4. In FIG. 4, the links 80 and 81, the shafts 83 and 84 and the extension 96 of the body of the force generator of FIG. 3 are indicated by the same reference numbers as in FIG. 3.

The force generator 85 is provided by an electrical torque motor comprising an armature 100 and field magnets 101 and 102 mounted within a body, indicated in the drawing by the broken outline 96'. The armature 100, the form of which is generally that of a bar of rectangular cross-section, is attached to the shaft 83 which passes through a hole near to one end of the armature in a direction at right angles to the major axis of the armature. The shaft 83 is supported by bearings, not shown in the drawing, mounted on the body 96', in a manner such that the other end of the armature is free to rotate through a few degrees of arc within air gaps 103 and 104 between the field magnets 101 and 102. Shaped portions of soft iron attached to the armature 100, enable the air gaps at the shaft end of the armature to be formed between cylindrical surfaces and therefore to be made relatively small, so that improved efficiency is obtained.

The field magnets 101 and 102 are energised by current fed to windings 105 and 106 respectively, from a source of supply of direct current, not shown, connected to terminals 107 and 108. Associated with the armature 100 is a winding 109 to which the desired force signals are fed from the amplifier 91, FIG. 3, by way of terminals, indicated in FIG. 4 by the same reference numbers 92 and 93 as in FIG. 3.

Position feedback is provided by a displacement transducer 110, the moveable element of which is attached to the extremity of the armature adjacent the gaps 103 and 104. The stator windings of the transducer are fed with alternating current from the source of supply connected to terminals 34 and 35. The armature winding providing the position feedback signal is connected to terminal 111 and from thence to the summing resistor 95, FIG. 3. Restraining springs 112 and 113 are associated with the armature to compensate for position instability of the device when the windings of the field magnets are energised, but no signal is applied to the armature winding 109. The armature is mass balanced, by means not shown, so that accelerations of the motor body 96' do not affect the positions of the armature.

The link 80 is clamped to the shaft 83 and is coupled to the link 82, FIG. 3, by a pivot which passes through a hole 114 in the link 80. The distance between the centre of the shaft 83 and the centre of the pivot hole 114 is such that the length of the armature is, for example, five times that of the effective length of the link 80 and a corresponding mechanical advantage is provided. The effective lengths of the links 80 and 81 are similar; hence, the parallelogram mechanism is provided by spacing apart the shafts 83 and 84 by an amount equal to the spacing of the pivot holes in the link 82.

Alternatively, the force generator 85 may be provided by a D.C. electrical motor having stator windings and a wound armature supported by a shaft, mounted to rotate in bearings. Current is fed to the armature winding from the source of supply of direct current connected to terminals 107 and 108, by way of flexible leads, instead of to brushes and slip rings, since the armature is required to rotate only through a few degrees of arc.

The stator windings are connected to the terminals 92 and 93, to which are fed the desired force signals from the amplifier 91, FIG. 3.

Position feedback is provided by a displacement transducer, similar to the displacement transducer 110, the moveable element of which is coupled to the armature shaft. The link 80 is clamped to the armature shaft and is coupled to the link 82, as already described with reference to FIG. 3.

The force in the system of the present invention may be generated by means other than by hydraulic jacks and electrical torque motors. For example, fluid filled bladders may be used, the pressure of the fluid being determined by a flow control valve in conjunction with a known leak or regulated by the use of a fluid amplifier.

An example of such a force generator will now be described with reference to FIG. 5. In the drawing, two bladders 121 and 122 of a force generator, indicated generally by the reference number 120, are mounted within two compartments of a rigid container 123. The container, of box-like form, is provided by an upper wall 124 and four side walls of rectangular shape. The container is shown in section in the drawing, hence, only three of the side walls 125, 126 and 127 are shown.

The bladders 121 and 122, which are of an elastic material, have flat portions 128 and 129 attached to the inner surface of the upper wall 124 of the container. When charged with fluid, the bladder 121 is of a size such that areas of its outer surface make contact with parts of the walls of a compartment of the container formed by the inner surfaces of the walls 125, 127, the side wall not shown and part of a surface 130 of a moveable member 131. When charged with fluid, the bladder 122 is of a size such that areas of its outer surface make contact with parts of the walls of a compartment of the container formed by the inner surfaces of the walls 126, 127, the side wall now shown and part of a surface 132 of the moveable member 131.

The moveable member 131 is supported by a shaft 134, which is mounted in bearings formed by holes in a slot 133 in the upper wall 124 of the container, in a manner to permit the member to rotate freely through a few degrees of arc in directions indicated in the drawing by the arrows 135 and 136. The holes forming the bearings are so positioned that the axis of the shaft 134 is parallel to the inner surfaces of the end walls 125 and 126 of the container and so that the two compartments within the container are of the same size, when the moveable member 131 is in a mid or neutral position. That is to say, when the fluid pressures in the bladders are equal and the bladders are of the same size.

The surfaces 130 and 132 of the moveable member 131 are inclined with respect to one another, so that the moveable member has the form of a wedge. The moveable member is supported by the shaft near to the narrow end of the wedge, hence, any tendency for the bladders to be expelled from the compartments of the container, when the bladders are under pressure, is avoided.

Attached to the narrow end of the moveable member 131 and protruding through the slot 133 is a link 137, similar to the link 80, FIG. 3, by which the force output of the generator 120 is transferred to the link 82, FIG. 3.

The bladders 121 and 122 are supplied with fluid under pressure by way of pipes 138 and 139, respectively, connected to the outlets of flow restrictors 140 and 141 respectively. The outlets of the flow restrictors 140 and 141 are also connected to the inlets of flow control valves 142 and 143 respectively. The inlets of the flow restrictors 140 and 141 and the outlets of the flow control valves 142 and 143 are connected by pipes 144 and 145 respectively, to the pressure outlet P and return inlet R respectively, of a source of supply of fluid not shown in the drawing.

The flow control valves 142 and 143 are controlled by control units 146 and 147 respectively, which are fed by way of terminals 148 and 149, with current from an amplifier similar to the amplifier 55 of FIGS. 1 and 2, or to the amplifier 91 of FIG. 3.

The control units are connected so that the moveable elements of the control valves 142 and 143 are displaced to cause the flow of fluid through them to increase and decrease respectively, when a voltage of positive polarity is applied to terminal 148 and so that the moveable elements of the control valves are displaced to cause the flow of fluid through them to decrease and increase respectively when a voltage of positive polarity is applied to terminal 149. Hence, the pressure in the bladder 121 is decreased and the pressure in the bladder 122 is increased when a voltage of positive polarity is applied to the terminal 148 and force is applied by the link 137 in the direction of the arrow 136. Similarly, the pressure in the bladder 121 is increased and the pressure in the bladder 122 is decreased when a voltage of positive polarity is applied to the terminal 149 and force is applied by the link 137 in the direction of the arrow 135.

In the embodiment described, A.C. computing systems are employed in the computer of the flight simulator. When it is desired to use the apparatus of the invention in a simulator in which D.C. computing systems are employed, the potentiometers producing the answer signals are fed from a source of supply of direct current and D.C. amplifiers are used.

What I claim is:

1. Flight simulating apparatus including a control member which is displaceable manually, computing means for computing an electrical quantity representing in magnitude a force required to load the control member according to the displaced position thereof, force generating means having a moving member adapted to apply force to the control member, said force generating means being responsive to the said electrical quantity, means responsive to the control member displacement for displacing the said force generating means to a position corresponding to the displaced position of the control member, whereby the range of displacement of the moving member of said force generating means, for applying said force to the control member, is small relatively to the range of displacement of said force generating means, in which manual displacement of said control member provides corresponding displacement of a linearly displaceable member, a follow-up hydraulic jack having a fixed member and a relatively moveable member for displacing the said force generating means, said follow-up hydraulic jack being controlled by a control valve having a moveable setting member connected to be positioned according to the position of the linearly displaceable member, the moveable setting member of the control valve being mechanically connected to said linearly displaceable member.

2. Flight simulating apparatus including a control member which is displaceable manually, computing means for computing an electrical quantity representing in magnitude a force required to load the control member according to the displaced position thereof, force generating means having a moveable member adapted to apply force to the control member, said force generating means being responsive to the said electrical quantity, means responsive to the control member displacement for displacing the said force generating means to a position corresponding to the displaced position of the control member, whereby the range of displacement of the moving member of said force generating means, for applying said force to the control member, is small relatively to the range of displacement of said force generating means, in which manual displacement of said control member provides corresponding displacement of a linearly displaceable member, a follow-up hydraulic jack having a fixed member and a relatively moveable member for displacing the said force generating means, said follow-up hydraulic jack being controlled by a control valve having a moveable setting member connected to be positioned according to the position of the linearly displaceable member, in which the moveable setting member of the control valve is moved by an electrodynamic unit supplied with the output signal of a summing amplifier, said summing amplifier having an input signal from an electric signal generator controlled by the position of the said linearly displaceable member and an answering signal supplied by an electric signal generator controlled by the position of the said force generating means.

3. Flight simulating apparatus including a control member which is displaceable manually, computing means for computing an electrical quantity representing in magnitude a force required to load the control member according to the displaced position thereof, a force generating means having a moving member adapted to apply force to the control member, said force generating means being responsive to the said electrical quantity, follow-up means responsive to the control member displacement for displacing the said force generating means to a position corresponding to the displaced position of the control member, whereby the range of displacement of the moving member of said force generating means in applying said force to the control member, is small relatively to the range of displacement of said force generating means produced by said follow-up means, in which said force generator is a second hydraulic jack having relatively movable cylinder and ram members, one member thereof being fixed relatively to the movable member of the follow-up hydraulic jack and the other member thereof being connected to apply a force to the control member.

4. Flight simulating apparatus as claimed in claim 3, in which said second hydraulic ram is controlled by a hydraulic control valve having a moveable settting member controlled by an electrodynamic control unit, which control unit is controlled by the said electrical quantity computed by said computing means.

5. Flight simulating apparatus as claimed in claim 4, in which the said lever is connected to electrical means for generating a position feedback signal for supply to the said computing means.

6. Flight simulating apparatus as claimed in claim 3, in which the control member is mechanically connected to first and second pivoted lever arms, the said other member of said force generator being connected to one of said lever arms.

7. Flight simulating apparatus as claimed in claim 6, in which said first and second lever arms are spring loaded towards an undisplaced pivotal position thereof.

8. Flight simulating apparatus including a control member which is displaceable manually, computing means for computing an electrical quantity representing in magnitude a force required to load the control member according to the displaced position thereof, force generating means having a moving member adapted to apply force to the control member, said force generating means being responsive to the said electrical quantity, means responsive to the control member displacement for displacing the said force generating means to a position corresponding to the displaced position of the control member, whereby the range of displacement of the moving member of said force generating means, for applying said force to the control member, is small relatively to the range of displacement of said force generating means, in which manual displacement of said control member provides corresponding displacement of a linearly displaceable member, a follow-up hydraulic jack having a fixed member and a relatively moveable member for displacing the said force generating means, said follow-up hydraulic jack being controlled by a control valve having a movable setting member connected to be positioned according to the position of the linearly displaceable member, in which said linearly displaceable member includes a parallel linkage having at least one link which is pivotable by a driving shaft of said force generator, and in which said force generator is a torque motor adapted to develop a torque at the said driving shaft, and wherein the torque motor is an electrical torque motor having a pivoted armature, which armature is connected to said driving shaft and deflected by field magnets energized according to the magnitude of said electrical quantity.

9. Flight simulating apparatus including a control member which is displaceable manually, computing means for computing an electrical quantity representing in magnitude a force required to load the control member according to the displaced position thereof, force generating means having a moving member adapted to apply force to the control member, said force generating means being responsive to the said electrical quantity, means responsive to the control member displacement for displacing the said force generating means to a position corresponding to the displaced position of the control member, whereby the range of displacement of the moving member of said force generating means, for applying said force to the control member, is small relatively to the range of displacement of said force generating means, in which manual displacement of said control member provides corresponding displacement of a linearly displaceable member, a follow-up hydraulic jack having a fixed member and a relatively moveable member for displacing the said force generating means, said follow-up hydraulic jack being controlled by a control valve having a moveable setting member connected to be positioned according to the position of the linearly displaceable member, in which said linearly displaceable member includes a parallel linkage having at least one link which is pivotable by a driving shaft of said force generator, and in which said force generator is a torque motor adapted to develop a torque at the said driving shaft, and wherein the torque motor is a direct current motor having magnetic field generating means and a wound armature fed, through flexible leads, with a current corresponding to the magnitude of said electrical quantity.

10. Flight simulating apparatus including a control member which is displaceable manually, computing means for computing an electrical quantity representing in magnitude a force required to load the control member according to the displaced position thereof, force generating means having a moving member adapted to apply force to the control member, said force generating means being responsive to the said electrical quantity, means responsive to the control member displacement for displacing the said force generating means to a position corresponding to the displaced position of the control member, whereby the range of displacement of the moving member of said force generating means, for applying said force to the control member, is small relatively to the range of displacement of said force generating means, in which manual displacement of said control member provides corresponding displacement of a linearly displaceable member, a follow-up hydraulic jack having a fixed member and a relatively moveable member for displacing the said force generating means, said follow-up hydraulic jack being controlled by a control valve having a moveable setting member connected to be positioned according to the position of the linearly displaceable member, in which said linearly displaceable member includes a parallel linkage having at least one link which is pivotable by a driving shaft of said force generator, and in which said force generator is a torque motor adapted to develop a torque at the said driving shaft, and wherein the torque motor is a fluid motor having a moveable member which is moved according to the differential pressure exerted by two fluid-filled expansible vessels respectively supplied with fluid by valve means controlled according to the magnitude of said electrical quantity.

References Cited

UNITED STATES PATENTS 3,220,121   11/1965   Cutler _____ 35—12

EUGENE R. CAPOZIO, Primary Examiner

P. V. WILLIAMS, Assistant Examiner